(12) United States Patent
Li

(10) Patent No.: US 11,762,234 B2
(45) Date of Patent: Sep. 19, 2023

(54) BACKLIGHT MODULE AND DISPLAY DEVICE

(71) Applicant: TCL CHINA STAR OPTOELECTRONICS TECHNOLOGY CO., LTD., Shenzhen (CN)

(72) Inventor: Lixia Li, Shenzhen (CN)

(73) Assignee: TCL CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 405 days.

(21) Appl. No.: 17/251,346

(22) PCT Filed: Oct. 23, 2020

(86) PCT No.: PCT/CN2020/123174
§ 371 (c)(1),
(2) Date: Dec. 11, 2020

(87) PCT Pub. No.: WO2022/077547
PCT Pub. Date: Apr. 21, 2022

(65) Prior Publication Data
US 2022/0308396 A1    Sep. 29, 2022

(30) Foreign Application Priority Data
Oct. 14, 2020 (CN) .......................... 202011096031.3

(51) Int. Cl.
*G02F 1/133* (2006.01)
*G02F 1/13357* (2006.01)
*G02F 1/1335* (2006.01)

(52) U.S. Cl.
CPC .. *G02F 1/133603* (2013.01); *G02F 1/133611* (2013.01); *G02F 1/133612* (2021.01)

(58) Field of Classification Search
CPC ......... G02F 1/133603; G02F 1/133611; G02F 1/133612
(Continued)

(56) References Cited

U.S. PATENT DOCUMENTS 4,717,868 A    1/1988 Peterson
2009/0168401 A1*    7/2009 Kwon ............... G02F 1/133611
362/97.1
(Continued)

FOREIGN PATENT DOCUMENTS

CN    1584956 A    2/2005
CN    101630096 A    1/2010
(Continued)

*Primary Examiner* — Christopher M Raabe
(74) *Attorney, Agent, or Firm* — The Roy Gross Law Firm, LLC; Roy Gross

(57) ABSTRACT

The present disclosure provides a backlight module and a display device. The backlight module includes a substrate layer and light-emitting diode (LED) light bars equidistantly disposed on the substrate layer. Wherein, each of the LED light bars includes a signal line and LED lamp beads. The LED lamp beads are arranged on the signal line and electrically connected to the signal line. Wherein, a distribution density of the LED lamp beads gradually decreases from a low-level end of the signal line to a high-level end of the signal line.

14 Claims, 2 Drawing Sheets

(58) Field of Classification Search
USPC .......................................................... 362/97.1
See application file for complete search history.

(56) References Cited

U.S. PATENT DOCUMENTS

2016/0365026 A1  12/2016  Bower et al.
2019/0025647 A1   1/2019  Cheng

FOREIGN PATENT DOCUMENTS

| CN | 103196113 A |   | 7/2013 |
|----|-------------|---|--------|
| CN | 103499072 A |   | 1/2014 |
| CN | 103619101 A |   | 3/2014 |
| CN | 203671404 U |   | 6/2014 |
| CN | 103619101 B | * | 9/2015 |
| CN | 105590590 A |   | 5/2016 |
| CN | 205645861 U |   | 10/2016 |
| CN | 107390428 A |   | 11/2017 |
| CN | 107657900 A |   | 2/2018 |
| CN | 208832394 U |   | 5/2019 |
| CN | 210053617 U |   | 2/2020 |

* cited by examiner

BACKLIGHT MODULE AND DISPLAY DEVICE

CROSS REFERENCE TO RELATED APPLICATIONS

This application is a National Phase of PCT Patent Application No. PCT/CN2020/123174 having International filing date of Oct. 23, 2020, which claims the benefit of priority of Chinese Application No. 202011096031.3 filed on Oct. 14, 2020. The contents of the above applications are all incorporated by reference as if fully set forth herein in their entirety.

FIELD OF INVENTION

The present disclosure relates to the field of display device technologies, and particularly relates to a backlight module and a display device.

BACKGROUND OF INVENTION

With development of display technologies, liquid crystal display (LCD) devices and other flat display devices are widely used in mobile phones, televisions, personal digital assistants, digital cameras, notebook computers, desktop computers, and other consumer electronic products because of their advantages of high image quality, power-saving, thin body, and wide range of applications. Therefore, LCD devices have become mainstreams in the display devices. Most LCD devices in the existing market are backlight LCD devices, and they include a liquid crystal display panel and a backlight module. A working principle of the LCD panel is arranging liquid crystal molecules between two parallel glass substrates. There are many vertical and horizontal thin wires between the two glass substrates. Directions of the liquid crystal molecules can be controlled by turning power on or off, and light of the backlight module can be refracted out to produce images. Because the LCD panel itself does not emit light, it needs to use a light source provided by the backlight module to display images normally. Therefore, the backlight module becomes one of key components of the LCD devices. The backlight module is divided into side-light type backlight module and direct-light type backlight module according to a different incident position of a light source.

As shown in FIG. 1, there is a direct-light type backlight module in the prior art, which adopts an array type LED surface light source. The direct-light type backlight module is provided with a plurality of LED lamp beads 11, and the LED lamp beads 11 are electrically connected to each other by signal lines 12. Resistance feature of the signal lines 12 leads to an internal resistance (IR) drop problem, which makes brightness of the whole backlight module non-uniform and affects the display effect of the display device.

Technical Problems

An object of the present disclosure provides a backlight module and a display device to solve a problem of non-uniform brightness of the backlight module in the prior art.

Technical Solutions

In order to achieve the above object, the present disclosure provides a backlight module. The backlight module includes a substrate layer and light-emitting diode (LED) light bars equidistantly disposed on the substrate layer. Wherein each of the LED light bars includes a signal line and a plurality of LED lamp beads. The signal line extending from one side of the substrate layer to a corresponding other side. The LED lamp beads arranged on the signal line and electrically connected to the signal line. Wherein a distribution density of the LED lamp beads gradually decreases from a low-level end of the signal line to a high-level end of the signal line.

Further, in each of the LED light bars, a distance between adjacent two of the LED lamp beads is less than 100 microns.

Further, in each of the LED light bars, a distance between an nth one of the LED lamp beads and an (n+1)th one of the LED lamp beads close to the low-level end of the signal line is less than a distance between the nth one of the LED lamp beads and an (n−1)th one of the LED lamp beads close to the high-level end of the signal line, and wherein n is greater than or equal to 2.

Further, a dimension of each of the LED lamp beads is less than 300 microns.

Further, the backlight module further includes a chip on film, the chip on film disposed on a side of the substrate layer and connected to the high-level end of the signal line.

Further, the backlight module further includes an array substrate, the array substrate disposed on a surface of the substrate layer, and the LED light bars being disposed on a surface of the array substrate away from the substrate layer.

Further, a control circuit is disposed in the chip on film, and the control circuit is connected to the signal line.

Further, the thinner the signal line, the larger a resistance of the signal line, and the larger the distribution density of the LED lamp beads.

Further, the LED lamp beads are at least one of white LED lamp beads, red LED lamp beads, green LED lamp beads, or blue LED lamp beads.

The present disclosure also provides a display device, includes the backlight module as claimed above.

Beneficial Effects

The advantages of the present disclosure are: a backlight module and a display device provided in the present disclosure can improve an overall brightness by increasing a number of the LED lamp beads at the low-level position of the signal line, thereby solving a problem of non-uniform brightness due to IR drop, thereby improving a brightness uniformity of the backlight module and a display effect of the display device.

Figure 1:
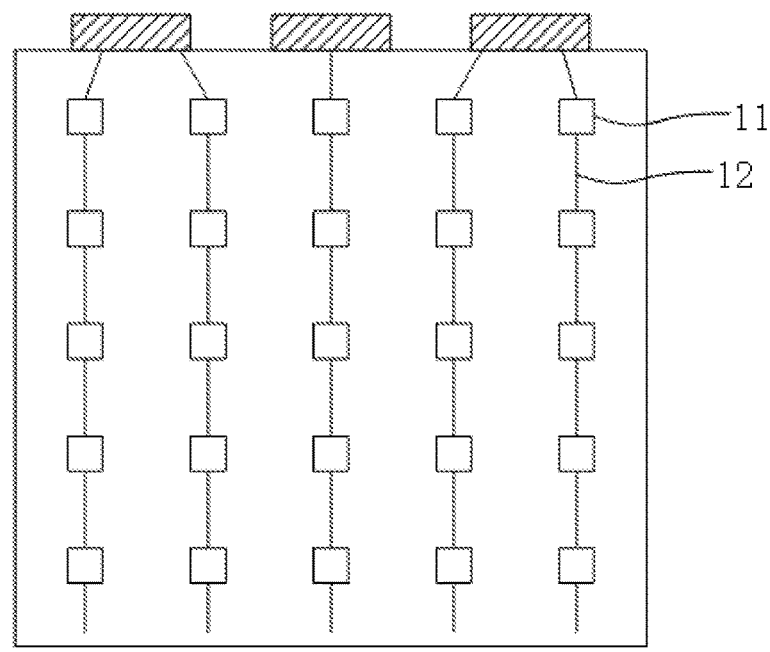
FIG. 1 is a distribution schematic view of LED lamp beads of a backlight module in the prior art.

backlight module 1;
LED light bar 10;
LED lamp bead 11;

signal line 12;
array substrate 20;
substrate layer 30;
chip on film 40.

DETAILED DESCRIPTION OF EMBODIMENTS

Preferred embodiments of the present disclosure will be described hereinafter with reference to the accompanying drawings, to testify that the present disclosure can be implemented. The embodiment of the present disclosure can be completely introduced to those skilled in the art, to better clarify technical content of the present disclosure, to it easily be understood. The present disclosure can be embodied in many different forms, the scope of the present disclosure is not limited to the embodiments mentioned in the text.

An embodiment of the present disclosure provides a display device, which includes an LCD panel, and the LCD panel provides display images for the display device. The display device may be any display device with a display function, such as a mobile phone, a notebook computer, a television, and so on. Because a liquid crystal layer in the LCD panel does not have a self-luminous function, the LCD panel also includes a backlight module 1 providing a backlight source for the LCD panel.

Figure 2:
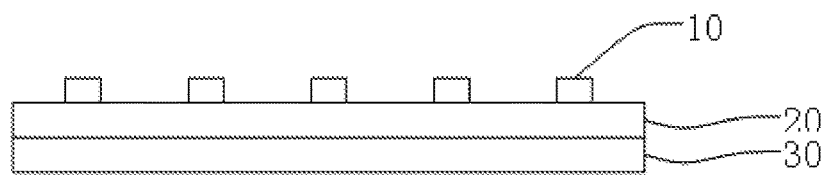
FIG. 2 is a layered structural schematic view of a backlight module in an embodiment of the present disclosure.

Referring to FIG. 2, the backlight module 1 is a direct-light type backlight source, which includes a substrate layer 30, a chip on film 40, a plurality of LED light bars 10, and an array substrate 20.

The array substrate 20 is disposed on a surface of the substrate layer 30, a plurality of thin film transistors are arranged in the array substrate 20, and the thin film transistors control opening or closing of each LED lamp bead 11 disposed on the LED light bar 10.

The chip on film 40 is disposed on a side of the substrate layer 30. A control circuit is disposed in the chip on film 40, the array substrate 20 and the LED light bar 10 are connected to the control circuit, and the control circuit sends control signals to control brightness of each LED lamp bead 11 disposed on the LED light bar 10.

The LED light bars 10 are arranged on a surface of the array substrate 20 away from the substrate layer 30, a distance between each adjacent two of the LED light bars 10 is equal, and the distance between adjacent two of the LED light bars 10 is less than 100 microns, preferably the distance between adjacent two of the LED light bars 10 is less than 50 microns.

Referring to FIG. 2, the plurality of LED lamp beads 11 are installed on the LED light bar 10, and the LED lamp beads 11 are arranged in a line on the LED light bar 10. Each of the LED lamp beads 11 adopts a mini light emitting diode (mini-LED) with a dimension less than 300 microns. The plurality of LED light bars 10 are arranged in the backlight module 1, and the LED lamp beads 11 in each of the LED light bars 10 emit light to provide a backlight source for the display device. The backlight source is generally white light, which can be formed by white light LED lamp beads emitting light directly, or can be formed by red light LED lamp beads, green light LED lamp beads, and blue LED lamp beads emitting light in combination. Wherein, a distance between adjacent two of the LED lamp beads 11 is less than 100 microns, and a distribution density of the LED lamp beads 11 disposed on the LED light bar 10 is different, and a distribution density of the LED lamp beads 11 gradually decreases from one end of the LED light bar 10 to the other end.

The LED light bar 10 also includes a signal line 12, which extends from one side of the array substrate 20 close to the chip on film 40 to one side of the array substrate 20 away from the chip on film 40. One end of the signal line 12 is connected to the control circuit in the chip on film 40, and is connected to each of the LED lamp beads 11 on the LED light bar 10 in turn to provide a voltage control signal for the LED lamp beads 11. Due to an existence of a resistance of the signal line 12, resulting in a difference between voltage values at both ends of the signal line 12, level values at both ends of the signal line 12 are different. Wherein, a high-level end of the signal line 12 is an end connected to the chip on film 40, and a low-level end of the signal line 12 is an end away from the chip on film 40. Because a voltage at the low-level end is low, a power of the LED lamp beads 11 near the low-level end is also reduced, a brightness of which is insufficient, and an overall brightness distribution of the backlight module 1 is uneven.

Figure 3:
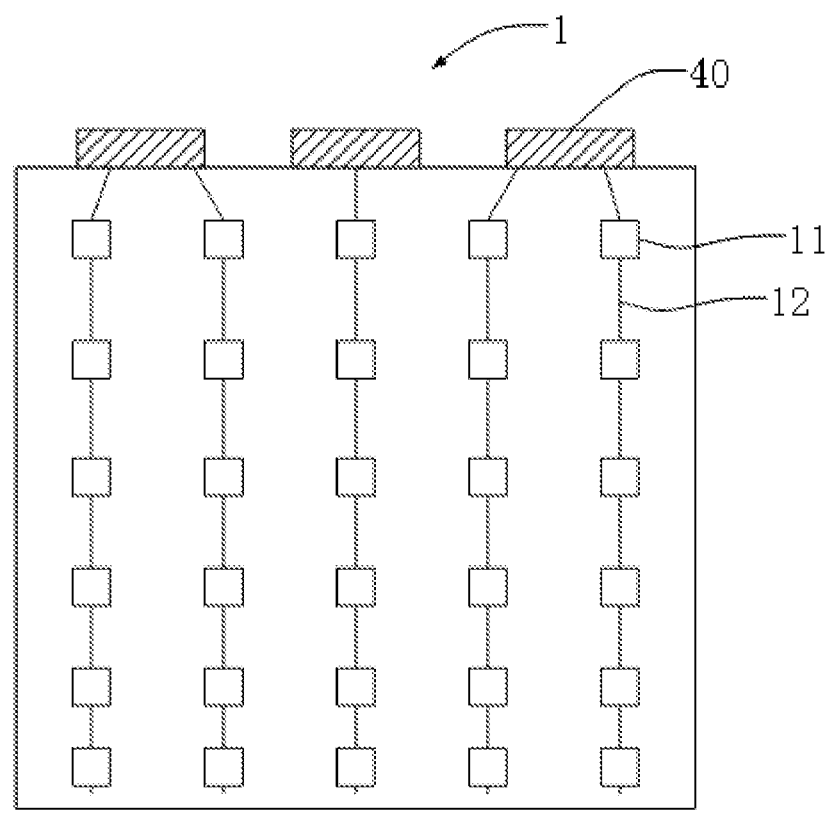
FIG. 3 is a distribution schematic view of LED lamp beads of the backlight module in an embodiment of the present disclosure.

In the LED light bar 10 provided by the embodiment of the present disclosure, the distribution density of the LED lamp beads 11 close to the low-level end of the signal line 12 is greater than the distribution density of the LED lamp beads 11 close to the high-level end of the signal line 12, which increases the number of LED lamp beads 11 around the low-level end of the signal line 12, thereby improving the overall brightness at the low-level end. Wherein, a distance between an adjacent nth one of the LED lamp beads 11 and an (n+1)th one of the LED lamp beads 11 close to the low-level end of the signal line 12 is less than a distance between the adjacent nth one of the LED lamp beads 11 and an (n−1)th one of the LED lamp beads 11 close to the high-level end of the signal line 12, and wherein n is greater than or equal to 2. For example, in FIG. 3, counting from top to bottom, in each of the LED light bars 10, a distance between second LED lamp bead 11 and first LED lamp bead 11 which is on a upper side of the second LED lamp bead 11 and close to the high-level end of the signal line 12 is greater than a distance between the second LED lamp bead 11 and third LED lamp bead 11 which is on a lower side of the second LED lamp bead 11 and close to the high-level end of the signal line 12, and so on, and the distribution density of the LED lamp beads 11 at the low-level end is gradually increased, so that the closer to the low-level end, the more LED lamp beads 11 are disposed, thereby solving the problem of the overall non-uniform brightness of the backlight module 1 caused by insufficient brightness of the LED lamp beads 11 at the low-level end. Further, the thinner the signal line, the larger its resistance value and the larger the distribution density of the LED lamp beads.

The backlight module 1 provided in the embodiment of the present disclosure increases a number of LED lamp beads 11 at the low-level end of the signal line 12 by changing an arrangement mode of the LED lamp beads 11, thereby improving a brightness at the low-level end of the signal line 12, solving the problem of non-uniform brightness distribution caused by IR drop, improving the brightness of the dark part of the backlight module 1, allowing light to emit more uniformly, and improving the display effect of the display device.

Although the present disclosure is described referencing specific embodiments in the article, it should be understood that these embodiments are merely examples of principles and applications of the present disclosure. Therefore, it should be understood that many modifications can be made to the exemplary embodiments, and other arrangements can be devised as long as they do not deviate from the spirit and scope of the present disclosure as defined by the appended claims. It should be understood that different dependent claims and features described herein can be combined in ways different from those described in original claims. It is also understood that the features described in a single embodiment can be used in other embodiments.

What is claimed is:

1. A backlight module, comprising:
a substrate layer; and
at least two light-emitting diode (LED) light bars disposed on the substrate layer;
wherein each of the LED light bars comprises:
a signal line extending from one side of the substrate layer to a corresponding other side; and
LED lamp beads arranged on the signal line and electrically connected to the signal line;
wherein a distribution density of the LED lamp beads gradually decreases from a low-level end of the signal line to a high-level end of the signal line;
wherein a distance between each adjacent two of the LED light bars is equal, and the distance between each adjacent two of the LED light bars is less than 50 microns, the LED lamp beads are arranged in a line on the LED light bar, and each of the LED lamp beads comprises a mini light emitting diode (mini-LED) with a dimension less than 300 microns.

2. The backlight module as claimed in claim 1, wherein in each of the LED light bars, a distance between adjacent two of the LED lamp beads is less than 100 microns.

3. The backlight module as claimed in claim 1, wherein in each of the LED light bars, a distance between an nth one of the LED lamp beads and an (n+1)th one of the LED lamp beads close to the low-level end of the signal line is less than a distance between the nth one of the LED lamp beads and an (n−1)th one of the LED lamp beads close to the high-level end of the signal line, and wherein n is greater than or equal to 2.

4. The backlight module as claimed in claim 1, further comprising:
a chip on film disposed on a side of the substrate layer and connected to the high-level end of the signal line.

5. The backlight module as claimed in claim 1, further comprising:
an array substrate disposed on a surface of the substrate layer, and the LED light bars being disposed on a surface of the array substrate away from the substrate layer.

6. The backlight module as claimed in claim 4, wherein a control circuit is disposed in the chip on film, and the control circuit is connected to the signal line.

7. The backlight module as claimed in claim 1, wherein the LED lamp beads are at least one of white LED lamp beads, red LED lamp beads, green LED lamp beads, or blue LED lamp beads.

8. A display device, comprising:
a liquid crystal display (LCD) panel; and
a backlight module providing a backlight source for the LCD panel;
wherein the backlight module comprises:
a substrate layer; and
at least two LED light bars disposed on the substrate layer;
wherein each of the LED light bars comprises:
a signal line extending from one side of the substrate layer to a corresponding other side; and
LED lamp beads arranged on the signal line and electrically connected to the signal line;
wherein a distribution density of the LED lamp beads gradually decreases from a low-level end of the signal line to a high-level end of the signal line;
wherein a distance between each adjacent two of the LED light bars is equal, and the distance between each adjacent two of the LED light bars is less than 50 microns, the LED lamp beads are arranged in a line on the LED light bar, and each of the LED lamp beads comprises a mini light emitting diode (mini-LED) with a dimension less than 300 microns.

9. The display device as claimed in claim 8, wherein in each of the LED light bars, a distance between adjacent two of the LED lamp beads is less than 100 microns.

10. The display device as claimed in claim 8, wherein in each of the LED light bars, a distance between an nth one of the LED lamp beads and an (n+1)th one of the LED lamp beads close to the low-level end of the signal line is less than a distance between the nth one of the LED lamp beads and an (n−1)th one of the LED lamp beads close to the high-level end of the signal line, and wherein n is greater than or equal to 2.

11. The display device as claimed in claim 8, further comprising:
a chip on film disposed on a side of the substrate layer and connected to the high-level end of the signal line.

12. The display device as claimed in claim 8, further comprising:
an array substrate disposed on a surface of the substrate layer, and the LED light bars being disposed on a surface of the array substrate away from the substrate layer.

13. The display device as claimed in claim 11, wherein a control circuit is disposed in the chip on film, and the control circuit is connected to the signal line.

14. The display device as claimed in claim 8, wherein the LED lamp beads are at least one of white LED lamp beads, red LED lamp beads, green LED lamp beads, or blue LED lamp beads.

* * * * *